United States Patent [19]

Bechu

[11] Patent Number: 4,618,129
[45] Date of Patent: Oct. 21, 1986

[54] VIBRATION DAMPING ARRANGEMENT

[75] Inventor: Jean-Pierre Bechu, Courbevoie, France

[73] Assignee: Caoutchouc Manufacture et Plastiques, Bezons, France

[21] Appl. No.: 603,150

[22] Filed: Apr. 23, 1984

[30] Foreign Application Priority Data

Apr. 22, 1983 [FR] France ............................... 83 06612

[51] Int. Cl.$^4$ .............................................. F16F 9/04
[52] U.S. Cl. ................... 267/140.1; 267/8 R; 267/64.14
[58] Field of Search ............... 248/550, 636, 631, 615, 248/562; 188/378, 269; 267/8 R, 136, 140.1, 35, 141, 63 R, 152, 64.14, 64.19, 64.17, 64.23, 64.27; 303/40

[56] References Cited

U.S. PATENT DOCUMENTS

| 2,998,244 | 8/1961 | Francis | 267/64.14 |
| 3,181,917 | 5/1965 | Dobrikin et al. | 303/40 |
| 3,730,473 | 5/1973 | Pepi | 248/550 |
| 4,029,305 | 6/1977 | Schubert et al. | 267/64.27 |

FOREIGN PATENT DOCUMENTS

| 0124426 | 12/1984 | European Pat. Off. | 267/140.1 |
| 0124427 | 12/1984 | European Pat. Off. | 267/140.1 |

Primary Examiner—Bruce H. Stoner, Jr.
Assistant Examiner—Alvin Oberley
Attorney, Agent, or Firm—Antonelli, Terry & Wands

[57] ABSTRACT

A vacuum-operated mount for mounting an engine of a passenger or commercial motor vehicle which includes a variable volume chamber enclosed by a thick rubber encasement. The encasement is adapted to tolerate a force greater than the suspended engine under the effect of a moderated vacuum affected by controlling a connection of the variable volume chamber with two additional enclosures or chambers so as to increase or decrease a vacuum in the work chamber in order to create an accelerating force for correcting a displacement of the engine.

7 Claims, 2 Drawing Figures

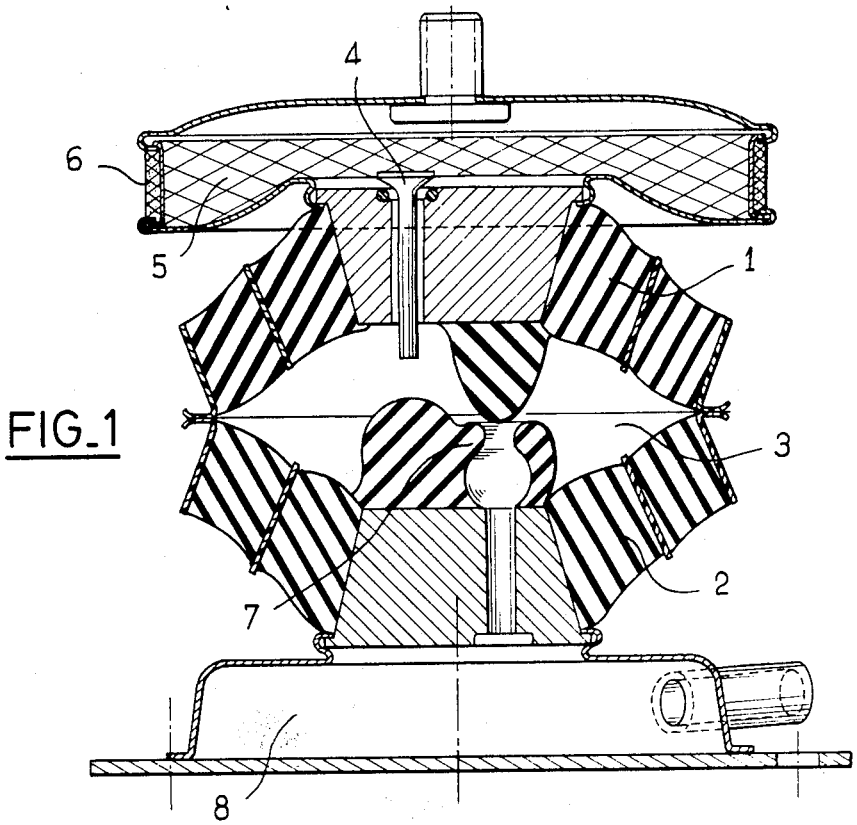
FIG._1
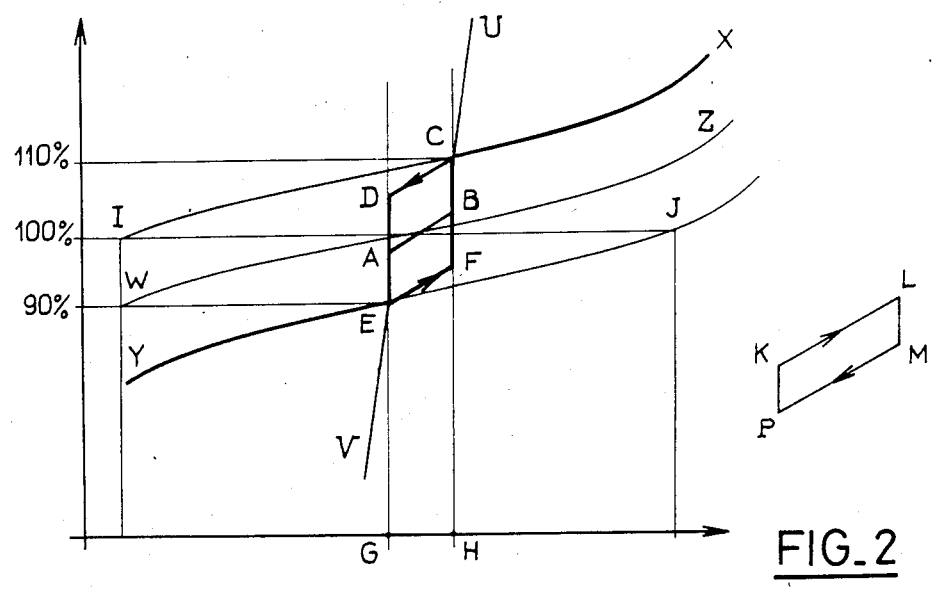
FIG._2

VIBRATION DAMPING ARRANGEMENT

BACKGROUND OF THE INVENTION

The present invention relates to an insulation arrangement for reducing machine vibrations and, more particularly, to an engine mount for mounting a naturally aspirated gasoline engine in passenger and commercial motor vehicles as well as motor vehicles equipped with diesel engines having a vacuum pump.

In order to enhance the riding comfort in passenger compartments of, for example, passenger motor vehicles, there have been a number of proposals seeking to provide greater flexibilities for the engine mount with an aim toward filtering out high frequencies. These greater flexibilities may cause a phenomenon known as "chop" or resonance in the suspended masses of the motor vehicle which may occur, for example, on good roads with wavy coating. To counteract this phenomenon, it is necessary to take steps to damp the displacements of the engine mounts wich would excess one millimeter.

Various devices such as, for example, hydraulic arrangements have been proposed which attempt to counteract the above-noted phenomenon without interferring with the filtering effect of the high frequency vibrations, with a nearly universal solution for a power unit or engine mount taking the form of a rubber support structure.

More particularly, in order to allow for a flexibility of several millimeters under load, it has been proposed to utilize one or more circular conical sections provided with a thick rubber shell, working both in shear and in compression which makes it possible to form a variable volume enclosure defining two chambers between which a liquid such as, for example, a hydraulic fluid, is transferred so as to enable an absorption of the high frequency oscillations.

One disadvantage of the above proposed hydraulic mounts resides in the fact that, by virtue of the realiance of the mounts on a damping fluid, there is a chance not only of a leakage of the damping fluid but also, in certain circumstances, a freezing of the damping fluid thereby adversely affecting the overall performance of the mount, reducing the life span thereof, and increasing the overall maintenance requirements.

Yet another disadvantage of the above noted proposed hydraulic mounts resides in the fact that, aside from being relatively complicated, the mounts also have a substantial weight thereby increasing the total weight of the vehicle suspension system.

The aim underlying the present invention essentially resides in providing an insulation arrangement such as, for example, a vibration damping engine mount for passenger or commercial motor vehicles which avoids, by simple means, the above-noted shortcomings and disadvantages encountered in the prior art.

In accordance with advantageous features of the present invention, a damping arrangement such as, for example, pneumatic engine mount for a passenger or commercial motor vehicle is provided which includes a membrane forming an enclosure or chamber of a variable volume, with the membrane being fashioned of a thick rubber wall bonded to reinforcement members. The damping arrangement is constructed so as to bear a force or load greater than the suspended load and, in fact, the force sustained is even greater due to the fact that, in accordance with the present invention, a moderated vacuum is provided which creates a static balance lower than the static position of the loaded membrane forming the chamber or enclosure. The vacuum that exists inside the chamber is modulated by a rapid connection of the enclosure to one of two additional chambers or enclosures on either side thereof with a slight clearance around a balance position of the load. On one hand, to allow the increase of the load, a limited volume previously brought to atmospheric pressure through a filter with a small opening section or, on the other hand, to allow a decrease of the load, another limited volume, previously subjected to a maximum vacuum of an engine or a vacuum pump, makes it possible to create an accelerating force to correct a displacement of the load when one of the two rapid connections is open. By virtue of these features, the accelerating force is limited to an acceptable value for comfort in a passenger compartment of the passenger or commercial vehicle of, for example, 0.2 times the value of the weight of the engine unit of the vehicle.

In order to compensate for a tendency of an oscillating cycle of notable amplitude to occur, a progressive return to atmospheric pressure on the one hand, and a maximum vacuum, in each of the chambers or enclosures provides a positive action that opposes the displacement of the load thereby providing active absorption of the displacement which can easily exceed a disturbing force at the origin of the displacement.

Advantageously, in accordance with further features of the present invention, the enclosure or chamber of variable volume is formed by two conical spring members or encasements formed of, for example, rubber, with the conical spring members being arranged so that the respective flexibilities thereof are disposed in a series in order to enable a bearing of the weight of a suspended load.

In order to enable a rapid connection of the variable volume chamber or enclosure, connection valve means are interposed between the additional chambers or enclosures and the variable volume chamber or enclosure.

The two additional chambers or enclosures, in accordance with the present invention, may have a common encasement with a rigid armature of the enclosure whose shape can be altered and superimposed on the rubber engine mount. Moreover, the atmospheric pressure return valve may be produced from a material that can change its shape such as, for example, a cellular elastomer, with a small amount of leakage being distributed throughout the encasement.

Other objects, features, and advantages of the present invention will become more apparent from the following description when taken in connection with the accompanying drawing which show, for the purposes of illustration only, one embodiment in accordance with the present invention.

BRIEF DESCRIPTION OF THE DRAWINGS

FIG. 1 is a longitudinal cross-sectional view of a vibration damping arrangement fashioned as an engine mount for a passenger or commercial vehicle constructed in accordance with the present invention; and FIG. 2 is a graphical illustration of a vertical displacement of the rubber mount with respect to forces exerted by the rubber mount on a suspended mass.

DETAILED DESCRIPTION

Referring now to the drawings and, more particularly, to FIG. 1, according to this figure, a vibration damping arrangement such as, for example, an engine mount for a passenger or commercial motor vehicle includes at least two conical spring members 1, 2 formed, for example, of a reinforced rubber material, with the conical spring members being vertically juxtaposed and joined so as to form a wall defining an enclosure or pneumatic chamber 3 in which there is a balance of pressure with a slight vacuum. A valve member 4 is displacably mounted in a portion of the conical spring member 1, with the valve member 4 being adapted to control a communication between the enclosure or chamber 3 and a further chamber 5 previously exposed to atmospheric pressure. A porous membrane 6 is provided in the chamber 5, to allow a progressive return to atmospheric pressure with the filter element 6 being adapted to retain dust particles which, if brought into the vacuum intake of, for example, a carburetor or vacuum pump, would adversely affect the operation thereof. Advantageously, the filter 6 is formed for example, from a felt material on a netting or by a variable shape wall from a cellular material, with the filter 6 having a predetermined volume dictated by the specific construction of the mount and having a slight permeability over an entire surface thereof.

A further valve member 7 is provided in the second conical spring member 2, with the further valve member 7 being adapted to control a communication between the enclosure or chamber 3 and a chamber 8 through a passage or bore 7c. The further valve member 7 includes a valve seat 7a mounted on a portion of the conical spring member 2 and a valve stem 7b mounted on the conical spring member 1 so as to be displaceable therewith to close the communication between the vacuum chamber 8 and the enclosure or chamber 3. The chamber 8 is subjected to the vacuum of an engine (not shown) or a vacuum pump (not shown) by a conduit or hose 8a connected to the engine or vacuum pump, with a further valve (not shown) being connected to the hose or conduit 8a so as to control the vacuum in the chamber 8.

In operation, if a load is applied to the mount of FIG. 1, the conical spring members 1, 2 are compressed and, during a compression of the spring members 1, 2, the valve member 4 comes into contact with a protrusion of valve member 7, fashioned as an elastic abutment, thereby opening the communication between the enclosure or chamber 3 and the chamber 5 which is at atmospheric pressure due to the gradual exposure of the chamber 5 to air through the filter element 6. Additionally, the compression of the conical spring members 1, 2 results in the valve 7, formed of molded rubber parts, being closed thereby interrupting the communication between the chamber or enclosure 3 and the chamber 8. Thus, a sudden or great reduction in the vacuum of the chamber or enclosure 3 to a previously calculated value brings the engine unit back to a higher balance position.

Conversely, upon removal of the load and relieving of the conical spring members 1, 2, the valve member 4 is brought into engagement with the conical seat first by gravity and then is forced on the seat by a differential pressure created when the seat 7a is disconnected from the valve stem 7b and permits the bore 7c to connect the enclosure or chamber 3 and the chamber 8 which is subjected to the vacuum of the engine or a vacuum pump. The volume of the vacuum to which the chamber 8 is subjected is calculated so as to increase the vacuum in such a manner to immediately reestablish the balance of pressure by lowering the position of the engine.

As shown most clearly in FIG. 2, a slight return of vacuum to the chamber 8 will prevent oscillations that would occur between the above-noted balance positions of the engine which are represented by the reference characters I, J. Within the limits G, H, where the communication to one of the two additional chambers or enclosures 5, the air mass enclosed in the working chamber or enclosure 3, due to its small volume, makes the system rigid as illustrated in the segment designated A, B, when there is a balance with the nominal load, which moves in parallel indicated by the reference characters D, C or E, F if the air mass is increased or decreased by the communication. When an oscillation displaces the balance point below G and above H, if the regulation that reestablishes a previous pressure occurs slowly in comparison to a cycle of oscillations, then the balance is described by a polytropic curve having a total volume CX or EY. In an opposite situation or in a situation wherein the level is immediately regulated, the forces brought into play are illustrated by the reference characters CU or EV, with the movements to correct the displacement being somewhat exaggerated in comparison to the required comfort for the passenger compartment of a motor vehicle.

With large amounts of engine displacement, the comfort in the passenger compartment of a passenger or commercial motor vehicle is thus equivalent to a comfort of a high flexibility pneumatic suspension that would follow the curve W, Z parallel to the two polytropic curves CX and EY with a difference in behavior representing active work absorbed in a given cycle. If the communication between the working chamber or enclosure 3 and one of the two additional chambers or enclosures 5, 8 closes at the limit point H, the expansion in the enclosure or chamber 3 follows a relatively steep slope C, D; however, on the contrary, a compression beginning at the limit point G follows the slope E, F until the other communication between the chamber or enclosure 3 and the other of the additional chambers or enclosures 5, 8 is made.

The work performed against the gravity with a mount constructed in accordance with the present invention is illustrated in the area E-F-C-D in FIG. 2 and represents a parallelogram followed in a counterclockwise direction which is the opposite of a hysterisis that transforms the lost energy into heat in accordance with the parallelogram K-L-M-P, which shows a friction absorption or an ellipse for a viscous absorption. Both of the above described diagrams would be in phase opposition in a periodic sinusoidal movement. If there is no time to re-establish the pressures, the parallelogram would be reduced to the segment A-B, and an experimental adjustment of the ports or openings establishing communication between the respective chambers would make it possible to select a desired compromise relative to the absorption without increasing the accelerating forces that are exerted on the load.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A mount means for damping vibrations of a load having a vacuum source, the mount means comprising: means for defining a variable volume chamber means, said means for defining being formed of a thick-rubber material bonded to rigid reinforcement members, said means for defining being adapted to elastically support a force greater than the force applied by gravity so as to support the load in a predetermined static position, means for communicating the variable volume chamber means with either the vacuum source through a limited volume chamber means or atmosphere through another limited volume chamber means defined in part by a porous membrane, said communicating means being adapted to control a moderate pressure so that a displacement of the load generates in the mount means accelerating forces counteracting said displacement, said accelerating forces being limited to a comfortable acceptable value of about 0.2 times a value of the weight of the load, wherein said limited acceleration forces are produced by an intermediate balance, through rapid communication between the variable volume chamber means and either one of the limited volume chamber means thereby said variable volume chamber means progressively reaches atmospheric pressure through said porous membrane after being previously subjected to a maximum value of the vacuum source.

2. A mount means according to claim 1, wherein said thick rubber material bonded to said rigid reinforcement members includes a pair of vertically juxtaposed conical spring element disposed so as to add flexibility thereto.

3. A mount means according to claim 1, wherein said communicating means for controlling moderate pressure includes a rubber valve seat means bonded to a rigid inner part of said means for defining and being adapted to engage a rubber valve stem means to block communication between the variable volume chamber means and the limited volume chamber means connected to the vacuum source.

4. A mount means for damping vibrations of a load, the mount means comprising: means for defining a variable volume chamber means, said means for defining being adapted to support a force greater than the force applied by gravity so as to support the load in a predetermined static position, means for communicating the variable volume chamber means with a vacuum source so as to subject the variable volume chamber means to a vacuum sufficient to create a static balance position of the load lower than the predetermined static position, means are provided for communicating the variable volume chamber means with a source of atmospheric pressure, means are provided for controlling a communication between the variable volume chamber means, the vacuum source, and the source of atmospheric pressure such that a displacement of the load generates in the mount means accelerating forces counteracting said displacement, said accelerating forces being limited to a comfortable acceptable value, and wherein said means for defining the variable volume chamber means includes a pair of conical spring members formed of a thick rubber material bonded to rigid conical reinforcement members.

5. A mount means for damping vibrations of a load, the mount means comprising: means for defining a variable volume chamber means, said means for defining being adapted to support a force greater than the force applied by gravity so as to support the load in a predetermined static position, means for communicating the variable volume chamber means with a vacuum source so as to subject the variable volume chamber means to a vacuum sufficient to create a static balance position of the load lower than the predetermined static position, means are provided for communicating the variable volume chamber means with a source of atmospheric pressure, means are provided for controlling a communication between the variable volume chamber means, the vacuum source, and the source of atmospheric pressure such that a displacement of the load generates in the mount means accelerating forces counteracting said displacement, said accelerating forces being limited to a comfortable acceptable value, and wherein said means for controlling includes a first metallic valve means displacable on a contact of a protrusion formed as an elastic bumper, which protrusion is a portion of a second valve means made of rubber, said second valve means includes a rubber valve seat means and a rubber valve stem adapted to engage said rubber valve means.

6. A mount means according to claim 1, wherein said communicating means for controlling the moderate pressure includes a first metallic valve means movable by a contact of a protrusion formed as an elastic bumper, said protrusion being a part of a second rubber valve means.

7. A mount means according to claim 1, wherein said limited volume chamber means are respectively provided having a common wall with the variable volume chamber means, each said common wall being a rigid part bonded to said thick rubber material.

* * * * *